(12) United States Patent
Bringsjord et al.

(10) Patent No.: US 9,882,932 B2
(45) Date of Patent: Jan. 30, 2018

(54) AUTOMATED SPEAR PHISHING SYSTEM

(71) Applicant: Deep Detection, LLC, Troy, NY (US)

(72) Inventors: Selmer Bringsjord, Troy, NY (US); Alexander Bringsjord, Troy, NY (US)

(73) Assignee: Deep Detection, LLC, Troy, NY (US)

( * ) Notice: Subject to any disclaimer, the term of this patent is extended or adjusted under 35 U.S.C. 154(b) by 79 days.

(21) Appl. No.: 14/676,919

(22) Filed: Apr. 2, 2015

(65) Prior Publication Data
US 2015/0288717 A1 Oct. 8, 2015

Related U.S. Application Data

(60) Provisional application No. 61/974,174, filed on Apr. 2, 2014.

(51) Int. Cl.
H04L 29/06 (2006.01)

(52) U.S. Cl.
CPC ............... H04L 63/1483 (2013.01)

(58) Field of Classification Search
USPC ............................................ 726/22
See application file for complete search history.

(56) References Cited

U.S. PATENT DOCUMENTS

| | | | | |
|---|---|---|---|---|
| 7,797,421 B1 * | 9/2010 | Scofield | ............... | G06F 15/173 709/203 |
| 7,971,246 B1 * | 6/2011 | Emigh | ................. | G06F 21/552 726/22 |
| 8,220,047 B1 * | 7/2012 | Soghoian | ............... | H04L 51/14 709/206 |
| 8,615,807 B1 * | 12/2013 | Higbee | ............... | G06Q 10/107 726/22 |
| 8,635,703 B1 * | 1/2014 | Belani | ................. | H04L 63/1433 726/22 |
| 8,769,684 B2 * | 7/2014 | Stolfo | ..................... | G06F 21/55 709/224 |
| 8,892,661 B2 * | 11/2014 | Ramarao | ............... | H04L 12/585 709/206 |
| 9,262,629 B2 * | 2/2016 | Belani | ................. | H04L 63/1483 |
| 2006/0015722 A1 * | 1/2006 | Rowan | ............... | H04L 63/0823 713/166 |
| 2007/0261112 A1 * | 11/2007 | Todd | ..................... | G06F 21/577 726/11 |

(Continued)

OTHER PUBLICATIONS

Zingerle, Andreas; Kronman, Linda. Humiliating Entertainment or Social Activism? Analyzing Scambaiting Strategies Against Online Advance Fee Fraud. 2013 International Conference on Cyberworlds (CW). Pub. Date: 2013. http://ieeexplore.ieee.org/stamp/stamp.jsp?arnumber=6680138.*

(Continued)

Primary Examiner — Jeremiah Avery
(74) Attorney, Agent, or Firm — Hoffman Warnick LLC

(57) ABSTRACT

A system, method and program product for spear phishing. As system is disclosed having a system for automatically constructing a background story using computational logic that includes true declarative content associated with a target; a system for automatically constructing an expanded story using computational logic that includes deceptive declarative content; and a communication generator that generates a communication including the true declarative content, the deceptive declarative content, and an actionable element.

18 Claims, 2 Drawing Sheets

(56) References Cited

U.S. PATENT DOCUMENTS

| | | | | |
|---|---|---|---|---|
| 2012/0254333 | A1* | 10/2012 | Chandramouli | G06F 17/27 709/206 |
| 2012/0278889 | A1* | 11/2012 | El-Moussa | H04L 63/1425 726/23 |
| 2013/0046531 | A1* | 2/2013 | Chandramouli | G06F 17/2715 704/9 |
| 2013/0138428 | A1* | 5/2013 | Chandramouli | G06F 17/274 704/9 |
| 2014/0298460 | A1* | 10/2014 | Xue | H04L 63/1425 726/23 |

OTHER PUBLICATIONS

Sheng, Steve; Kumaraguru, Ponnurangam; Acquisti, Alessandro; Cranor, Lorrie; Hong, Jason. Improving Phishing Countermeasures: An Analysis of Expert Interviews. eCrime Researchers Summit. Pub. Date: 2009. http://ieeexplore.ieee.org/stamp/stamp.jsp?arnumber=5342608.*

* cited by examiner

AUTOMATED SPEAR PHISHING SYSTEM

PRIORITY CLAIM

This application claims priority to provisional patent application Ser. No. 61/974,174 filed on Apr. 2, 2014 entitled AUTOMATED SPEAR PHISHING SYSTEM.

BACKGROUND

1. Technical Field

This invention relates generally to phishing systems and more particularly to spear phishing systems.

2. Related Art

Spear phishing is a form of phishing against a small group of selected targets who are more likely to be attracted. Phishing is the act of attempting to acquire sensitive information such as usernames, passwords, and credit card details (and sometimes, indirectly, money) by masquerading as a trustworthy entity in an electronic communication. Communications purporting to be from popular social web sites, auction sites, banks, online payment processors or IT administrators are commonly used to lure unsuspecting public. Phishing emails may contain links to websites that are infected with malware. Phishing is typically carried out by email spoofing or instant messaging and it often directs users to enter details at a fake website whose look and feel are almost identical to the legitimate one. Phishing is an example of social engineering techniques used to deceive users, and exploits the poor usability of current web security technologies. Attempts to deal with the growing number of reported phishing incidents include legislation, user training, public awareness, and technical security measures.

SUMMARY

The present invention provides an artificial intelligence system for automated spear phishing. The described system and method may for example be utilized for quality assurance purposes or any other purpose. A first aspect of the invention provides a spear phishing system, comprising: a system for automatically constructing a background story using computational logic that includes true declarative content associated with a target; a system for automatically constructing an expanded story using computational logic that includes deceptive declarative content; and a communication generator that generates a communication including the true declarative content, the deceptive declarative content, and an actionable element.

A second aspect of the invention provides a method of spear phishing, comprising: automatically constructing a background story using computational logic that includes true declarative content associated with a target; automatically constructing an expanded story using computational logic that includes deceptive declarative content; and generating a communication including the true declarative content, the deceptive declarative content, and an actionable element.

A third aspect of the invention provides a program product stored on a computer readable medium, which when executed, provides a spear phishing operation, comprising: program code for automatically constructing a background story using computational logic that includes true declarative content associated with a target; program code for automatically constructing an expanded story using computational logic that includes deceptive declarative content; and program code that generates a communication including the true declarative content, the deceptive declarative content, and an actionable element.

DETAILED DESCRIPTION

Figure 1:
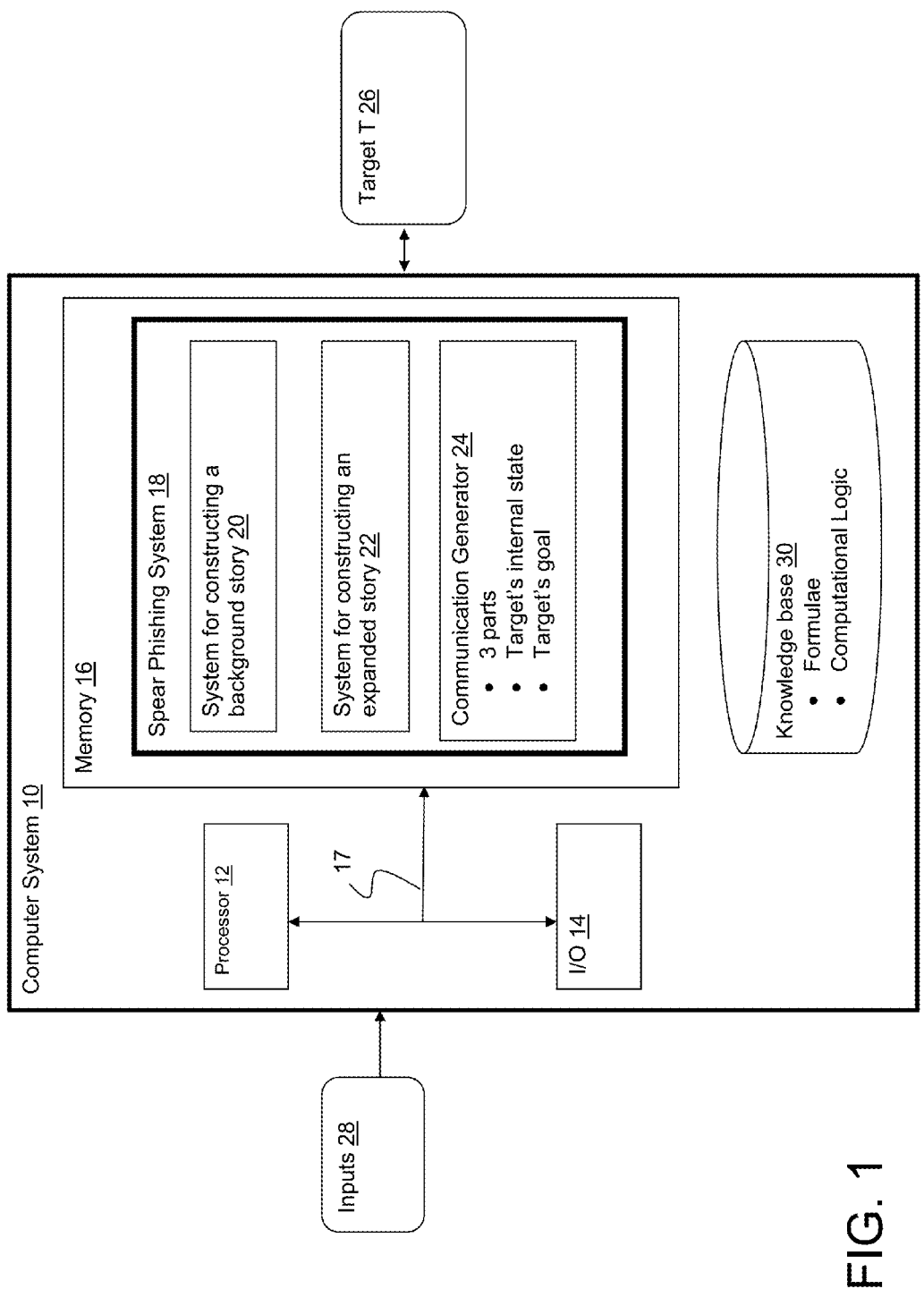
FIG. 1 depicts a computer system having an automated spear phishing system in accordance with an embodiment of the invention.

Referring now to the drawings, FIG. 1 depicts a computer system 10 that includes an illustrative embodiment of a spear phishing system 18 implemented using artificial intelligence. Spear phishing system 18 includes: a system for constructing a background story 20; a system for constructing an expanded story 22; and a communication generator 24. Communication generator 24 generates a communication for distribution to target T 26 to engage in a spear phishing process.

Illustrative spear phishing systems are described in more detail as follows with reference to FIG. 1.

As noted, phishing is the attempt to obtain sensitive information via causing certain actions on the part of human targets, where these attempts in turn consist of indiscriminate, deceptive electronic communication to/with these targets. One common form of electronic communication is of course email, but text messaging and in fact any form of electronic communication can be used. Usually the deception includes impersonation or masquerading. For instance, it would be phishing to compose and then send an email of the sort shown immediately below to all members of a large email list.

> John Vestgate <j.vestgated@cardvalidation123.com> 9:25 AM (17 minutes ago)
>
> Please immediately click on the link below and enter the requested information regarding your credit card account to re-validate this account.
>
> Failure to enter this information by 12 midnight tonight will result in the closing of your account, because we have detected suspicious activity in your account. If you fail to re-validate in time, you will be liable for the erroneous charges that have been made.
>
> http://www.cardvalidation123.com/revalidation
>
> John Vestgate
>
> Fraud Control
>
> Mastercard Obviously, if the link is clicked upon, the form that comes up will be configured to receive information such as the credit card number of the account, passwords, etc. In addition, there is no "John Vestgate." A criminal is masquerading as Vestgate. Spear phishing is quite different: it exploits specific pieces of information about a particular target, and about contextual information surrounding the target and his or her circumstances while preserving (from mere phishing) impersonation as well as the objective of obtaining sensitive information.

The approaches described herein provide a novel, unprecedented spear phishing system 18 that automates spear phishing. Given this description, it is entirely possible to implement the system 18 in order to allow a machine, with minimal inputs from a human, to automatically spear phish.

EXAMPLE 1

For example, suppose that Abigail Smith is recently engaged (to Billy), has scheduled her upcoming wedding six months from now, on July 15, has booked the exclusive Oak Tree Country Club (OTCC) for her reception, and has not firmed up any plans regarding musicians or menus for OTCC. In addition, Abigail's mother is Joan Smith who is known to have graduated from Claverack high school (CHS). Given this, the following email is an example of spear phishing.

> Harold Timbre <h.timbre@goldenweddings123.com> 11:17 AM (1 hour ago)
> Dear Abigail,
> Your mother Joan may not remember me well from way back in CHS. Back then I was really into music, and had my own band. Anyway, now I'm the CEO of Golden Weddings (you may have seen the brochure we sent by surface mail to your apt), and we offer a *free* service that I'd like to bring to your attention. If you click on the link below, and then click just a few preferences regarding the general style of music and food you would like for your big day at OTCC, our service will instantly generate a list of musicians, bands, and wedding-cake bakers who have worked with the great folks at OTCC before, and the info from our recommender system will include full ratings of the performance of these vendors by young newlyweds. Congratulations to you and John! I hope this service is of use to you.
> http://www.goldenweddings123.com/recommendersys
> Harold Timbre
> Golden Weddings
> www.goldenweddings123.com In this case, the moment the link is clicked upon, the computer that Abigail is using at that moment will be compromised.

EXAMPLE 2

Professor William Cohen is Chair of the Department of Economics at Billings College. One of the professors in the Department is Assistant Professor Axis Stordahl, who is two years away from a tenure decision. In point of fact, Stordahl does have and routinely use gmail when communicating with his Department Head Cohen. Stordahl very much wants to receive a high evaluation for the current calendar year. The standard inputs to a Chair for evaluation of his/her faculty include the curriculum vitae (CV). This is the background story. Here is the email for spear phishing:

> Axis Stordahl <a.stordahl@gmail.com> 4:58 PM (3 hours ago)
> Hi William:
> Before you finish your evaluation of me for calendar year 2014, I wanted to get you fresh copy of my CV. As you will see, I now an additional publication that I think will make a difference. To get the details of my new work, just click on the url immediately below.
> Thank you.
> http://www.stordahl123.com/CVaddendum.pdf
> Axis Stordahl
> Assistant Professor of Economics
> Billings College
> a.stordahl123@gmail.com In this case as in Example 1, the moment Cohen clicks up the link in this email, his computer will be accessible to the malicious agent who masqueraded as Axis.

Below is described a simple, brutally brief top-level description of an automated spear phishing system 18. Following that is a much more fine-grained account of how system 18 can be effective, using Example 1 and Example 2 to facilitate the exposition. Following that is described a core generation method, which gives rise, automatically, to the electronic communication that triggers the explained sequence. Finally, the tools are described for representing in computational logics that content that system 18 processes are available, and that therefore, given the descriptions provided here, system 18 can be implemented, and spear phishing thereby automated.

Top-Level Description of the Spear Phishing System

A top-level description of the system 18 is given as follows.

The system 18 starts with a target T specified by its user. The goal of the system 18 is to generate an electronic communication <k> (e.g., an email) to be sent to T such that T performs an "action" lambda relative to that email. For example, the action in question will often be to click on hyperlink in the email in question. In this case, the hyperlink is an instance of something $\lambda$ in the communication <k> that is to be acted upon by the target T. Using standard and widely known technology, if $\lambda$ is a hyperlink in an email, clicking on this hyperlink (which would be the action lambda), grants access to the computer or computer system of T. This access is of course given to the malicious agent M who sends the communication <k>. The relevant pre-established network connections are assumed to be in place. These connections are outside the scope of the invention, and are well-understood and easy to configure.

Figure 2:
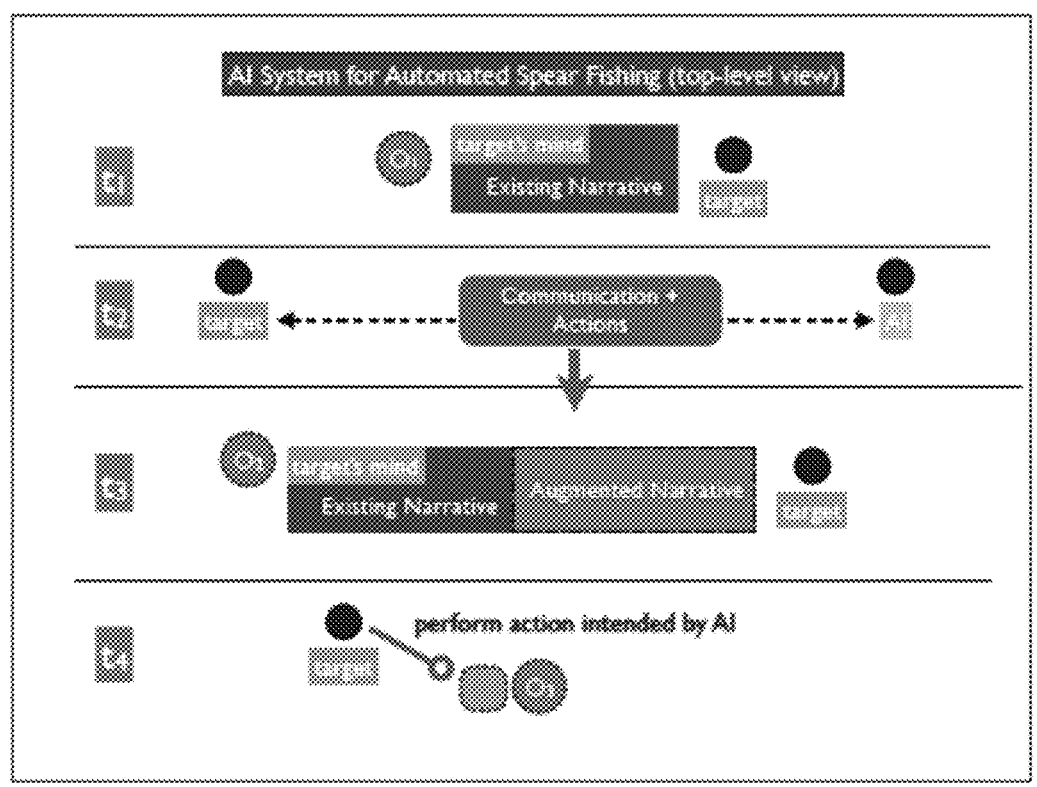
FIG. 2 depicts a spear phishing methodology in accordance with an embodiment of the invention.

The system begins by constructing a relevant representation, in the form of a background story N, of the target's beliefs, knowledge, background, plans, and goals, all expressed in a mathematical formalism rich enough to represent these entities. One such formalism could be CEC, the computational logic presented in numerous publications (e.g., Bringsjord, Govindarajulu, Ellis, McCarty & Licato 2014, Bringsjord & Govindarajulu, 2013). The output of this stage, marked as t1, as shown in FIG. 2, is O1. The system then augments the background story N to produce an expanded story N+ in which the target's mental state O2 at t3 is such that the target will be likely to perform action lambda at t4. Given O2, the system S then computes what communication <k> needs to happen so that T's state becomes O2. The system then generates English (or grammatically correct expressions in some other natural language, e.g., Spanish, Norwegian, etc.) to "clothe" communication <k>. This English is the communication then used for spear phishing.

Description of Sequence that Spear Phishing System Designed to Catalyze

Moving to a more detailed level, assume a target T, a malicious agent M, a character C who M impersonates, and electronic communication <k> (e.g., an email, a text message, etc.) that ultimately will be received by T.

In addition, assume that we are using the aforementioned cognitive event calculus (CEC), a computational logic that has been amply described in the literature (e.g., see Bringsjord et al. 2014, Bringsjord & Govindarajulu 2013), and can be used as a framework for modeling the cognition of human beings, representing stories, representing the content that is expressed in natural languages like English, and carrying out automated reasoning that is the primary mode of computation used by spear phishing system 18.

The following is an illustrative sequence that system 18 triggers, which is made possible by the suitable generation of <k>, and the procedure for that generation, G, which is described separately.

1. Assert Background Story as Common Knowledge

To begin, the formulae expressing the background story N are asserted as common knowledge into the knowledge base 30 of system 18. This can be done by asserting to the system 18 formulae expressed in CEC that describe the background story, and described specifically as well that all of T, M, and C know that these formulae hold. We use the notation <X> to denote the English (or some other natural language) that represents the underling technical formulae X. So, what is asserted into the knowledge base 30 of system 18 is N, and that each of the three agents knows all of the formulae in N. (In CEC, C is the so-called common knowledge operator, so what would be asserted into the knowledge base 30 of system 18 is C(N)).

In Example 1 given above, the background story includes that Abigail became engaged at some past time point to John, that at a certain future time point the two will be married, that their reception will happen on the day of that time point at OTCC, and so on.

2. Electronic Communication Automatically Generated

Next, the electronic communication <k> is automatically generated from the underlying content <k> expressed in the underlying computational logic by automated deduction. This communication <k> is composed of three semantic parts: true declarative content that recapitulates part of the veridical background story ($\tau$); new deceptive declarative content that is erroneous but part of a story N+ that is an augmentation of background story N(d); and a specific actionable element $\lambda$ in the communication (e.g., a url that T is asked to click on). If desired, additional communication <k+>, supplementary to <k>, can be sent to T as well; in that case, <k> is English (or grammatically correct expressions in some other natural language, such as Russian) that communicates four underlying semantic pieces of information.

Hence, in the case of Example 1:

<$\tau$> is the English communicating that Abigail is engaged, that she is engaged to John, that she is planning to get married in six months, that her reception will be at OTCC, etc. All of these underlying facts are represented as formulae that compose part of the background story N expressed in the underlying computational logic.

<d> is the English communicating the false information that there exists a John Vestgate (i.e., that C exists), that Vestgate attended CHS with Abigail's mother, that Vestgate is CEO of Golden Weddings, etc. Recall that d is part of the augmented story N+.

<$\lambda$> is the link within the email.

<k+> is the promotional material depicting Golden Weddings, sent to the apartment of Abigail, to which Vestgate refers in his email.

An aspect of the generation of the augmented story N+ is that that story is constructed to ensure that given this story, an important goal sought by the target T is regarded by T more likely to occur if T performs the action lambda in connection with $\lambda$.

3. Cause Target T to Perceive Semantic Information Conveyed, & Implications Thereof Next, the electronic communication <k> is sent to T seemingly from C. This causes the target T to perceive the semantic information $\tau$, d, $\lambda$, and optionally k+ as well. However, it is not assumed that the target, over and above perceiving this semantic information, also believes all of it to be true. What is assumed is that in the general method is that the target T also perceives that if the semantic information conveyed in <k> is true, certain things are true by inference.

In Example 1, Abigail, upon receiving the email in question, perceives that if that email is veridical, the link (barring some innocent malfunction) in the email will provide potentially useful information about vendors in position to provide services at her wedding reception. In command of this information, her goal ($\gamma$) of a nice reception will be more likely to be reached.

In Example 2, Professor Cohen, upon receiving the email in question, perceives that if that email is veridical, the link (barring some innocent malfunction) in the email will provide the citation details of new published work authored by Assistant Professor Stordahl. In command of this new information, his goal of evaluating Stordahl accurately will be more likely to be reached.

Referring to this implied propositional content as $\psi$. Technically, system 18 verifies by proof that follows deductively from the combination of $\tau$, d, $\lambda$, k+ (along with any other parts of the augmented story N+. Given that each of these four items are themselves sets of formulae, expressed in the customary notation of formal logic, that this quartet can be used to prove $\psi$ is written:

$$\tau \cap d \cap \lambda \cap k+ \vdash \psi$$

4. Cause Target to Test Implications

The target T, usually, will test the implications $\psi$. The tests in question can be purely mental, or they can in some instance involved concrete actions. The system 18 will thus contain formulae representing that the malicious agent M knows that the target will only assent to provided that these tests are passed.

5. Augmented Story Causes Target to want to Perform Key Action

Given the augmented story N+, understood by the target T from <k>, the target T desires to perform the action of $\alpha_\lambda$, with respect to the actionable element $\lambda$ included in the communication <k>.

In Example 1, the augmented story in question is one in which, in the past, Vestgate was passionate about music as a high schooler, and one in which, in the future, the musicians performing at Abigail's reception have been favorably reviewed by newlyweds who have reviewed them, and do an excellent job at her reception. Her desire to click on the link provided in the email to her is caused by the longer-term desire that this augmented story become real.

6. Key Action Performed by Target T; Spear Phishing Accomplished

Now the action alpha lambda is performed by the target T, and the spear phishing has proved effective.

The Generation Process G, Based on Story Augmentation

Prior research has been devoted to finding methods by which computers/computer programs could automatically generate stories; see (Bringsjord & Ferrucci 2000). This research was in the sub-field of AI known (unsurprisingly) as story generation. The present embodiments are based on the new concept of story augmentation. Story augmentation is what enables system 18 to generate the communication<k> used to spear phish.

One illustrative embodiment of the generation method includes the steps of (1) Augment, (2) Extract; (3) Clothe; and (4) Send. First, given as user input background story N, and future goal $\gamma$ of the target T, augment to an expanded story N+. Secondly, extract from augment story N+ true elements $\tau$ and untrue elements d that can be deceptively reported. Thirdly, express, i.e., clothe, $\tau$, d, $\lambda$ in a natural language such as English and place this in a communication <k>. Finally, send the communication <k> to target T, masquerading as C, a character in story N+.

Logic-Based Elements to Represent Inputs to and Elements in Spear Phishing System The following explains the computational "building-block" tools and formats needed to build instances of the system 18 are readily available from the logic-based or logicist portion of AI which is characterized in Bringsjord 2008b). In other words, given the novel description of system 18 provided above, the automation of spear phishing is indeed completely practicable.

Automated Deductive Reasoners

Here we refer to so-called automated theorem provers. Any standard, mainstream automated theorem prover at at least the level of first-order logic is sufficient to use as a building block in order to implement the invention described herein. For instance, one could use SNARK (Stickel, Waldinger, Lowry, Pressburger & Underwood 1994), or Isabelle (Paulson 1994), or even the built-in automated (resolution-based) theorem prover within the well-established Prolog programming language, and so on.

Representing Real People with Declarative Data in Computational Logics

Obviously there is more to a human being than any given set of formulae in any computational logic. However, a significant portion of the cognitive structure of what it is to be a human being, or a human person, can be modeled using computational logic (Bringsjord 2008a). A portion of this structure sufficient to undergird automated spear phishing as carried out by system 18 is all that is needed for the invention to provide a clear blueprint for how to implement a real, working automated spear phishing system 18. To put the point in terms of Example 1 and Example 2, the malicious agents in both of those cases do not need to intimately know their targets in order to produce communication that is likely to be effective (=likely to cause the targets to perform the desired clicking action). In addition, the malicious agents in both cases are using knowledge about targets that is readily representable in a computational logic such as CEC.

It is important to note that the availability of data regarding targets of automated spear phishing is clearly high. The internet provides an easy way to gather information about targets, and the acquisition of this data can as a matter of fact itself be automated. This is so because, increasingly, such data is available in structured formats that can be translated easily into formulae in computational logics like CEC. This holds for instance for any and all information expressed in formats used by the so-called Semantic Web. (This information is usually expressed in so-called description logics (Baader, Calvanese & McGuinness 2007), but all information expressed in these logics can be cast without loss of information into calculi such as CEC.)

Mental States Expressed in Computational Logics

CEC enables the mental states of human beings to be formalized. This is confirmed by, and discussed at length in, multiple publications, e.g., (Bringsjord & Govindarajulu 2013).

Stories in Computational Logics

We do not use the terms 'story' or 'narrative' in any imprecise sense herein. CEC subsumes the event calculus, eloquently and efficiently presented in (Mueller 2006), a work focused on the sub-discipline of story understanding. In this work, stories expressed in English are represented as formulae in the event calculus. Likewise, in system 18, stories are not something imprecise, let alone metaphorical, but are instead collections of such formulae. This is why system 18 is able to employ, at a key juncture, as explained above, the invented process of story augmentation, as a process that is rigorously defined and implementable. As indicated, a story N is augmented to give rise to the story N+ when, both before and after the time point that is the present for target T, additional events are added, in a way that: (i) preserves consistency with the formulae composing N; (ii) includes both the veridical (i.e., $\tau$), deceptive (i.e., d) portions of the communication <k> that T receives; and (iii) is constructed around the fact that there is some important $\gamma$ that the target T wishes to reach.

Logic-Based Natural Language Generation

System 18 is based on a form of natural language generation (NLG) that is exclusively logic-based. Nothing is left to chance, and none of the nuances of human language that AI and the field of natural language processing (NLP) have yet to solve are in any way obstacles to implementing system 18, given the description of the invention. In addition, system 18 does not require any natural language understanding (NLU) technology: System 18 is wholly on the generation side, not the understanding side, of NLP. The generation of English sentences from underlying formulae in a logic is well-understood, and such generation, at least when mental states are not referenced in the generated sentences, can be done in various ways, using correlates to fragments of CEC. For example, Blackburn & Bos (2005) show that from formulae in first-order logic, paired with the lambda-calculus, when processed by the reasoning built into the programming language Prolog, corresponding English sentences can be generated.

For reference to mental states such as belief, knowledge, desire, intention, goal-seeking, and so on, the formal language of CEC provides operators that map directly to the relevant English verbs, and hence the techniques in (Blackburn & Bos 2005) are readily extended. For instance, that some person Alvin believes some proposition p is expressed in CEC as $B(a, \varphi)$, where $\varphi$ is a formula that expresses the proposition p; and this formula can be mapped directly to a grammatically correct English sentence of the form "Alvin believes that <$\varphi$>."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative computer system 10 that may comprise any type of computing device and, and for example includes at least one processor 12, memory 16, an input/output (I/O) 14 (e.g., one or more I/O interfaces and/or devices), and a communications pathway 17. In general, processor(s) 12 execute program code, such as spear phishing system 20, which is at least partially fixed in memory 16. While executing program code, processor(s) 12 can process data, which can result in reading and/or writing transformed data from/to memory 16 and/or I/O 14 for further processing. Pathway 17 provides a communications link between each of the components in computer system 10. I/O 14 can comprise one or more human I/O devices, which enable a user to interact with computer system 40. To this extent, virtual wheel content system 20 can manage a set of interfaces (e.g., graphical user interfaces, application program interfaces, etc.) that enable humans and/or other systems to interact with the spear phishing system 20. Further, virtual wheel content system 20 can manage (e.g., store, retrieve, create, manipulate, organize, present, etc.) data using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A spear phishing system, comprising:
   a system for storing information unique to a target, wherein the target consists of an individual person and wherein the information includes at least one of a belief, a knowledge, a background, a plan or a goal of the target;

a system for expressing the information in a computational logic that represents beliefs, knowledge, backgrounds, plans, and goals in a mathematical formulism;

a system for automatically constructing a background story using computational logic that includes true declarative content determined from the information associated with the target;

a system for automatically constructing an expanded story based on the background story using computational logic that includes deceptive declarative content; and a communication generator that generates a unique communication for the target, including the expanded story and an actionable element.

2. The spear phishing system of claim 1, further comprising a system that electronically forwards the communication to the target.

3. The spear phishing system of claim 1, wherein the knowledge includes relationships the target has with other individuals.

4. The spear phishing system of claim 1, wherein the deceptive declarative content comprises an augmentation of the background story that adds at least one additional event consistent with the background story.

5. The spear phishing system of claim 1, wherein the communication is further based on a goal associated with the target.

6. The spear phishing system of claim 1, wherein the communication generator uses natural language generation to generate natural language from the computational logic.

7. A method of spear phishing, comprising:

collecting information unique to a target, wherein the target consists of an individual person and wherein the information includes at least one of a belief, a background, or a plan of the target;

expressing the information in a computational logic that represents beliefs, backgrounds, and plans in a mathematical formulism;

automatically constructing a background story using computational logic that includes true declarative content determined from the information associated with the target;

automatically constructing an expanded story based on the background story using computational logic that includes deceptive declarative content; and generating a communication including the expanded and an actionable element.

8. The method of claim 7, further comprising electronically forwarding the communication to the target.

9. The method of claim 7, wherein the information is stored as formulae in a knowledge base.

10. The method of claim 7, wherein the deceptive declarative content comprises an augmentation of the background story.

11. The method of claim 7, wherein the information includes relationships the target has with other individuals.

12. The method of claim 7, wherein the communication generator uses natural language generation.

13. A program product stored on a non-transitory computer readable storage medium, which when executed by a processor, provides a spear phishing operation, comprising:

program code for collecting information unique to a target, wherein the target consists of an individual person and where the information includes at least one of a belief, a knowledge, a background, a plan or a goal of the target;

program code for expressing the information in a computational logic that represents beliefs, knowledge, backgrounds, plans and goals in a mathematical formulism;

program code for automatically constructing a background story using computational logic that includes true declarative content determined from information uniquely associated with a target;

program code for automatically constructing an expanded story based on the background story using computational logic that includes deceptive declarative content; and program code that generates a communication including the true declarative content, the deceptive declarative content, and an actionable element.

14. The program product of claim 13, further comprising program code that electronically forwards the communication to the target.

15. The program product of claim 13, wherein the information is stored as formulae in a knowledge base.

16. The program product of claim 13, wherein the deceptive declarative content comprises an augmentation of the background story.

17. The program product of claim 13, wherein the information includes relationships the target has with other individuals.

18. The program product of claim 13, wherein the communication is generated using natural language generation.

* * * * *